INVENTORS:
ROY D. FINLEY
JAMES D. FLANIGAN
ELDRED W. BOWEN

Gravely, Lieder & Woodruff
ATTORNEYS,

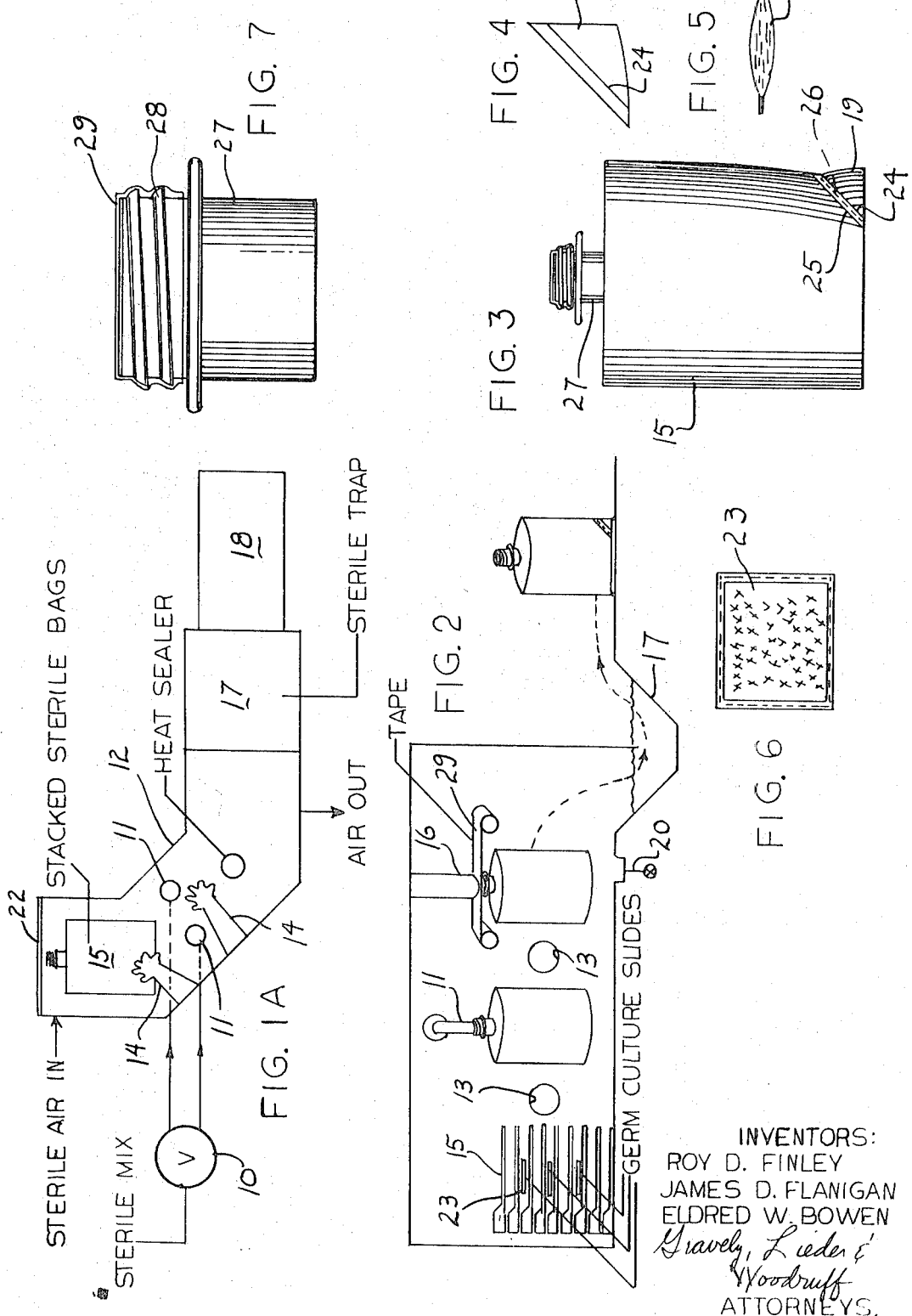

United States Patent Office 3,542,567
Patented Nov. 24, 1970

3,542,567
CONTAINER FOR ASEPTIC PACKAGING OF FLUID FOOD PRODUCTS
Roy D. Finley and James D. Flanigan, Greenville, Ill., and Eldred W. Bowen, Brentwood, Mo., assignors to Pet Incorporated, St. Louis, Mo., a corporation of Delaware
Original application Mar. 18, 1965, Ser. No. 440,829, now Patent No. 3,301,043, dated Sept. 10, 1968. Divided and this application Apr. 29, 1968, Ser. No. 738,742
Int. Cl. B65d 25/00
U.S. Cl. 99—171                     4 Claims

ABSTRACT OF THE DISCLOSURE

A flexible walled container for aseptically packaging fluid food products having a detachable sealed segment holding a representative sample of the container contents. The segment is heat sealed from the rest of the container such that it may be removed for testing without contaminating the remainder of the container contents.

---

This application is a division of application Ser. No. 440,829, filed Mar. 18, 1965, now Pat. No. 3,301,043.

This invention relates to a process of and apparatus for aseptically filling a sterile disposable package with a sterile food product. This invention further relates to a flexible walled package containing a sterile food product, and to a process of aseptically filling the same, and removing a sample portion without opening the sealed package.

Heretofore it has been impractical to fill a disposable flexible walled package with a sterile fluid under aseptic conditions. While it is common to aseptically can liquids in sheet metal containers, the present invention provides a method of filling a sterile fluid food product into a presterilized flexible walled container in an aseptic environment.

The present invention specifically relates to the packaging of a sterile ice cream mix into a flexible plastic bag which is filled under aseptic conditions. Many states have stringent laws restricting the sale of ice cream mix and similar products, and particularly restricting the time which the products may be stored because of numerous spoilage problems in the usual non-sterile product. The subject sterile product may be stored for many months and the food product is still maintained in sterile condition.

In commercial practice, it is essential to test sterile food products to determine if the product is, in fact, sterile. A statistically significant number of samples must be tested to give the results reliability. In a typical lot of 500, 30 to 60 should be examined to comprise a significant number. Destructive sampling of such a large fraction of the product is very expensive, particularly when the individual packages are of large volume. Present testing methods inherently require that the sterility of the package be broken to make a test and thus expensive product is ruined. Accordingly another principal object of the present invention is to provide a package containing a sterile food product and a means for providing an attached removable representative sample which, when detached, does not impair the sterility of the remainder of the product in the package or of the sample.

These and other objects and advantages of the present invention will become apparent hereinafter.

In the accompanying drawings herein like numbers refers to like parts wherever they occur:

FIG. 1a is similar to FIG. 1 but showing the chamber in greater detail;

FIG. 2 is similar to FIG. 1 but showing a side view;

FIG. 3 is a perspective view of the sample food package;

FIG. 4 shows the sample portion detached;

FIG. 5 is a side view of the detached sample;

FIG. 6 is a plan view of a germ culture package used to test the sterility of the empty packages; and FIG. 7 is an enlarged view of a pour spout with foil cover attached.

FIG. 1 is a flow diagram of the present process and the various steps are set out in the blocks. Various details of the process steps will be explained in greater detail hereinafter.

Figure 1:
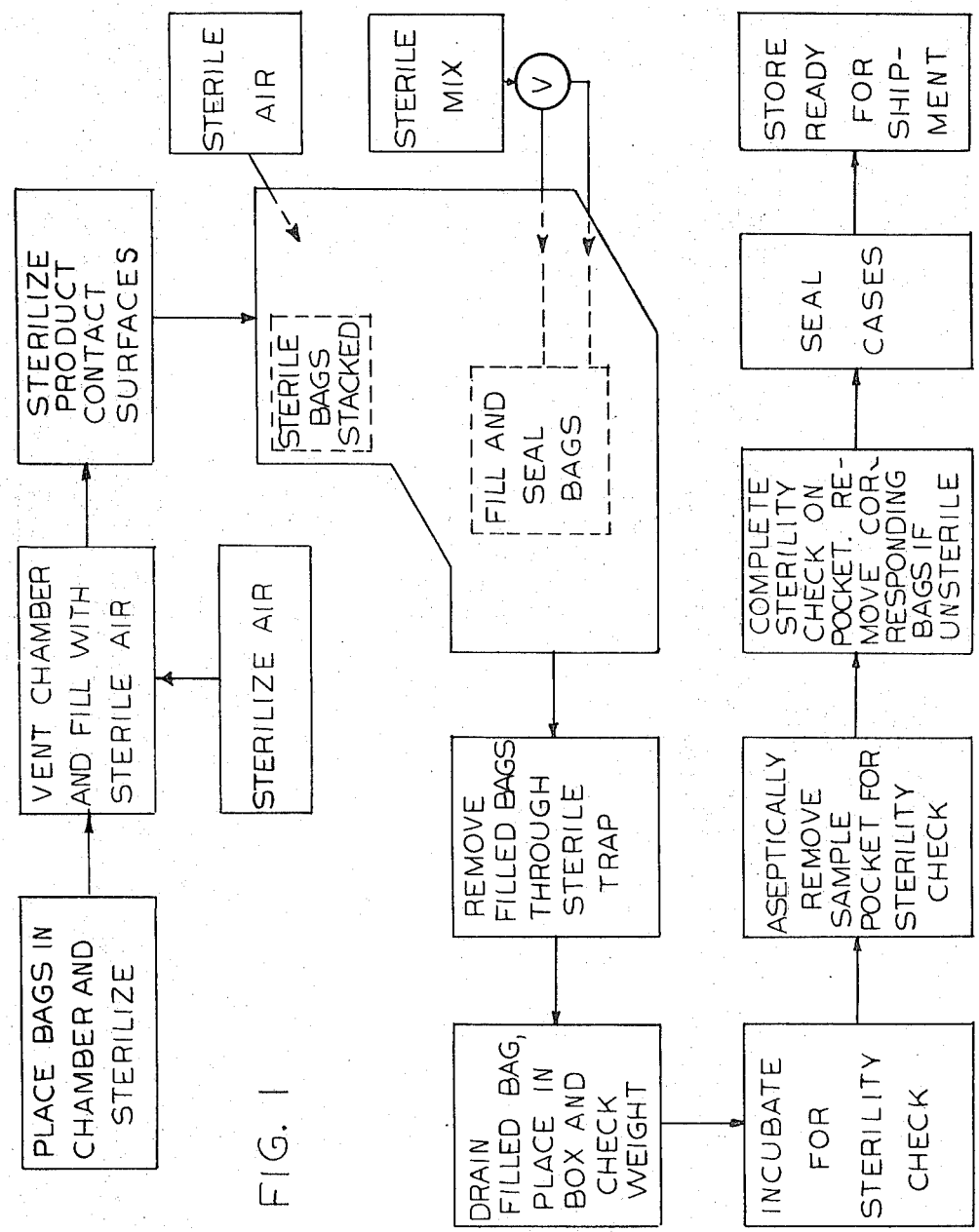
FIG. 1 is a diagrammatic respective flow diagram of the present invention.

FIG. 1a shows the bags being stacked in the chamber which subsequently is sealed, sterilized, vented, filled with sterile air, product contact surfaces sterilized, and readied for operation (FIG.1). The separately sterilized mix is passed to a timed switch valve 10 which delivers the product alternately to two filling nozzles 11 positioned in a sterile enclosed chamber 12. The sterile mix is passed to the valve 10 from a positive displacement pump (not shown) at a flow of approximately 6 gallons per 26 seconds. The product is at a temperature of approximately 80° F. the lower temperature being limited by the dew point within the chamber in order to avoid condensation on the surfaces of the pipes, and the upper temperature being limited by the flash point of the product being filled. The valve 10 is timed to alternate approximately every 26 seconds, since 6 gallons packages are conventionally filled in the chamber 12. The timing and delivery rate, of course, vary with the size package being filled and the designed flow rate of the process. However, since the product is metered by a positive displacement pump it is important that the flow through the valve 10 not be interrupted.

The sterile mixture may be prepared by any conventional method according to the particular product and the type of sterilization conditions preferred by the operator. Using an ice-cream mixture, conventional processing techniques are employed including mixing, standardization, pre-heating, HTST sterilization, and homogenization which involves heating to about 300° F. for about 3.8 seconds. Other sterilization techniques are satisfactory, and different conditions may be used for other food products.

The chamber 12 is provided with operator arm holes 13 to which are attached arm length rubber gloves 14 by means of which the operator can reach into the chamber 12 and manipulate a sterile bag 15. The bags 15 are stacked in the chamber 12 and the operator manually attaches the bags 15 to the fill nozzles 11. After a bag 15 is filled, the operator detaches the bag 15 from the first filling nozzle 11 and moves it to a heat sealing assembly 16, where a seal is applied to the pour spout opening on the bag 15. This assembly is shown in co-pending Bowen application, Ser. No. 418,723, now Pat. No. 3,425,887 which is hereby incorporated into the present specification.

The operator then attaches another bag 15 to the first filling nozzle 11, so that when the bag 15 attached to the second filling nozzle 11 has been filled, the valve 10 will automatically switch the flow of fluid from the second fill nozzle 11 back to the first fill nozzle 11. The sealed filled flexible container 15 is passed through a sterile trap 17 onto a platform 18 and thereafter placed in a suitable paper board shipping container.

The chamber 12 is maintained with a sterile environment by the passage of sterile air under about one-half to three inches of pressure (water) and a temperature of about 60 to 80° F. The air is sterilized by heating it to approximately 600° F. The air is cooled before it is passed to the chamber 12.

The liquid in the trap 17 is tap water having about fifty to four-hundred parts per million of chlorine. This provides a bactericidal liquid seal and insures sterility. Another advantage of the sterile trap 17 is that sterile tools in sealed packages can be passed from outside the chamber 12 through the trap or lock 17 to the workman manning the gloves 14 to repair the inside of the chamber 12 without affecting its sterility. This is important, since it is difficult to sterilize the chamber 12 and this avoids much interruption of the process flow that might otherwise occur. The chamber 12 is provided in its lower most part with an exhaust valve 20, which operates as a check valve and permits any water or product which may accumulate in the chamber 12 to be exhausted.

The chamber 12 and bags 15 are pre-sterilized prior to operation. A sufficient supply of bags 15 is stacked in the chamber 12 through a door 22 and germ culture packages 23 are interspersed in the stacks of bags 15. The chamber 12 is free of moisture and doors are placed over the water trap 17 and glove parts 13 prior to sterilization. Ethylene oxide gas or other suitable sterilizing gas is applied to the chamber 12 for 3 to 15 hours (preferably 6 to 8) to sterilize the chamber 12 and its contents, including the bags 15. A minimum of 385 milligrams of pure ethylene oxide per liter of contents (unit volume of container) is added to the chamber 12. There is no free water in the ethylene oxide. Moisture in the form of dry steam is introduced into the chamber to maintain 20 to 60% relative humidity and uniform chamber temperature is maintained at 60 to 120° F. and preferably at 80 to 110° F. With polyethylene bags, 125° F. is about the maximum temperature, although with polypropylene the gas can reach 250° F. The higher the temperature, the faster and more effective is the sterilization action of the ethylene oxide.

The germ culture packages 23 comprises filter paper having one million bacterial spores per disc, and two discs per package 23 (the disc is about ½ inch in diameter). The discs are sealed in a plastic bag which is of the same material as the bags 15 to be filled. Approximately five test packets 23 are used per thousand bags 15. The bags are presumed to be sterile when all bacterial spores in the test packets are killed.

Before the filling operation starts the chamber 12 is exhausted of ethylene oxide by pulling a 26-inch vacuum on the chamber 12. The arm hatches 13 and the water trap 17 are covered. After the ethylene oxide is exhausted, the chamber 12 is filled with sterile air. This cycle is repeated again to assure all the ethylene oxide has been removed from the chamber 12. During filling, the sterile environment is maintained by the flow of sterile air through the chamber 12 as hereinbefore discussed.

The heat sealers 16, the tape rolls 29, and the fill nozzles 11 are operated by air cylinders which use sterile air which is exhausted into the chamber 12 to further insure sterility.

The preferred container 15 is of 4 mil polyethylene and is single walled. It has been found that double walled bags tend to inflate during the previously described evacuation and refilling process.

The seal 29 is of foil backed polyethylene.

Packages are randomly selected from each day's production for statistical evaluation of sterility. The packages are incubated for 72 hours at 80° F., after which they are agitated by shaking and sampled as hereinafter described.

The sample 19 is formed by applying a double heat seal to one corner of the bag. Thus, the sample portion 19 has a sealed edge 24 and the bag 15 also has a sealed edge 25. To remove the sample 19, a cut is made (shown by the broken lines 26 in FIG. 3) between the sealed edges 24 and 25. Thus, a small, sealed sample representative of the entire contents of the primary package can be removed without impairing the integrity and value of the primary package. Thereafter a corner of the sample 19 is severed with a sterile hot wire and the sample product can be removed without contamination for inoculation into nutrient broth with further incubation to determine sterility and for direct microscopic examination.

Another advantage of the present package is that a reclosable feature is provided, so that the purchaser, after opening the sealed package, can reclose it if all the product is not used immediately. The rigid pour spout 27 is provided with threads 28 so that the purchaser, after removing the heat-sealed over-wrap 29 can apply a screw cap to reseal the container 15. Other types of closures can be used, such as snap-caps, friction caps, etc.

Other forms of openings in the containers 15 can be used instead of the rigid pour spouts 27, although these are presently preferred.

In addition to ice cream mix, other fluid or semi-fluid food products which can be aseptically packed, such as milk, evaporated milk, cream, fruit juice, tomato puree, etc., are suitable for use in the present process.

Thus, it is seen that the present invention provides aseptic filling process and production which achieves all the objects and advantages sought therefore.

Thus invention is intended to cover all changes and modifications of the examples of the invention herein considered for the purpose of the disclosure and does not constitute departure from the spirit and scope of the invention.

What is claimed is:
1. A food package comprising:
 (a) a flexible walled container,
 (b) a pour spout attached to the container,
 (c) a seal covering the pour spout opening,
 (d) sterile fluid food product in the container,
 (e) a detachable sealed segment of the container holding a representative incubated sample of the container contents, and,
 (f) means for detaching the sample without contaminating the remainder of the container's contents.

2. The package of claim 1 wherein the package walls are of 4 mil polyethylene and the sample is separated from the remainder of the package by a heat seal.

3. The package of claim 2 wherein the pour spout is a rigid polyethylene and the seal is metal by which it is a polyethylene coating on the surface by which it is attached to the pour spout opening.

4. The package of claim 3 wherein the pour spout has screw threads on its outer surface.

References Cited
UNITED STATES PATENTS
2,759,656   8/1956   Abrams.
3,162,539   12/1964   Repko.
3,163,544   12/1964   Valyi.
3,255,907   6/1966   Eddy _____ 215—40

FRANK W. LUTTER, Primary Examiner

W. L. MENTLIK, Assistant Examiner

U.S. Cl. X.R.
206—46; 220—20

PO-1050
(5/69)

UNITED STATES PATENT OFFICE
CERTIFICATE OF CORRECTION

Patent No. 3,542,567          Dated   November 24, 1970

Inventor(s)  Roy D. Finley, James D. Flanigan & Eldred W. Bower

It is certified that error appears in the above-identified patent and that said Letters Patent are hereby corrected as shown below:

In the paragraph under the title, the patent number should read "3,401,043" and not "3,301,043".

In Column 1, line 25, the patent number should read "3,401,043" and not "3,301,043".

In Column 4, Claim 3, line 2, cancel "a" and substitute therefor "of", after "metal" add "foil" and cancel "by which it is" and substitute therefor "having".

Signed and sealed this 27th day of April 1971.

(SEAL)
Attest:

EDWARD M. FLETCHER, JR.          WILLIAM E. SCHUYLER, JR.
Attesting Officer                Commissioner of Patents